United States Patent [19]
Artieri

[11] Patent Number: 5,717,899
[45] Date of Patent: Feb. 10, 1998

[54] SYSTEM FOR WRITING WORDS INTO MEMORY IN FIRST ORDER AND CONCURRENTLY READING WORDS FROM MEMORY IN SECOND ORDER BASED ON INPUT OUTPUT RANKS OF WORDS

[75] Inventor: Alain Artieri, Meylan, France

[73] Assignee: SGS-Thomson Microelectronics S.A., Saint Genis, France

[21] Appl. No.: 388,022

[22] Filed: Feb. 13, 1995

[30] Foreign Application Priority Data

Feb. 16, 1994 [FR] France ................. 94 02071

[51] Int. Cl.$^6$ .......................................... G06F 15/02
[52] U.S. Cl. ........................................... 395/477
[58] Field of Search ......................... 395/821, 823, 395/824, 476, 477, 412, 414, 421.09, 421.1, 464, 557, 559, 859; 365/230.05, 230.09, 189.01, 189.04, 221

[56] References Cited

U.S. PATENT DOCUMENTS

| | | | |
|---|---|---|---|
| 4,393,444 | 7/1983 | Weinberg | 395/484 |
| 4,516,201 | 5/1985 | Warren et al. | 395/200.2 |
| 4,563,702 | 1/1986 | Heller et al. | 380/10 |
| 4,608,633 | 8/1986 | Boothroyd et al. | 395/421.04 |
| 4,803,654 | 2/1989 | Rasberry et al. | 395/250 |
| 4,807,044 | 2/1989 | Kikuchi et al. | 358/448 |
| 4,807,122 | 2/1989 | Baba | 395/427 |
| 4,847,812 | 7/1989 | Lodhi | 365/221 |
| 4,995,005 | 2/1991 | Lodhi | 365/221 |
| 5,042,007 | 8/1991 | D'Luna | 365/78 |
| 5,117,486 | 5/1992 | Clark et al. | 395/250 |
| 5,177,704 | 1/1993 | D'Luna | 365/78 |
| 5,206,684 | 4/1993 | Wada et al. | 395/115 |
| 5,206,834 | 4/1993 | Okitaka et al. | 365/239 |
| 5,210,863 | 5/1993 | Tomita | 395/183.01 |
| 5,253,213 | 10/1993 | Matsumura et al. | 365/230.09 |
| 5,274,589 | 12/1993 | Koshizuka | 365/189.01 |
| 5,276,837 | 1/1994 | Sakane | 365/230.05 |
| 5,283,763 | 2/1994 | Pham et al. | 365/221 |
| 5,293,540 | 3/1994 | Trani et al. | 348/584 |
| 5,293,586 | 3/1994 | Yamazaki et al. | 395/519 |
| 5,440,706 | 8/1995 | Juri et al. | 395/412 |
| 5,455,907 | 10/1995 | Hess et al. | 395/507 |
| 5,473,443 | 12/1995 | Wilkinson | 386/49 |

FOREIGN PATENT DOCUMENTS

A-0250976  1/1988  European Pat. Off. .

*Primary Examiner*—Moustafa M. Meky
*Attorney, Agent, or Firm*—Wolf, Greenfield & Sacks, P.C.; James H. Morris

[57] ABSTRACT

A data reorganization process includes a dual-port memory coupled to a system for writing words in a first predetermined order and for reading the words in a second predetermined order. A register cooperates with the circuit authorizing reading of the words only if the content of the register is non-zero. The content of the register is decremented at each read and incremented at each write. The increment is equal to one plus the difference between the input rank of the current word provided on the first bus and the output rank of this word if the difference is non-negative, and whose value is zero if the difference is negative. The effective value of this increment is such that the sum of the increments that are used until the writing of the current word is written is lower than, or equal to, the sum of the optimum values of these used increments.

43 Claims, 4 Drawing Sheets

SYSTEM FOR WRITING WORDS INTO MEMORY IN FIRST ORDER AND CONCURRENTLY READING WORDS FROM MEMORY IN SECOND ORDER BASED ON INPUT OUTPUT RANKS OF WORDS

BACKGROUND OF THE INVENTION

1. Field of the Invention

The present invention relates to ordering circuits that receive data in a first predetermined order and provide the data in a second predetermined order.

2. Discussion of the Related Art

Ordering circuits generally use a dual-port memory, i.e., memory in which it is possible to write with an input bus and a first address bus and in which it is possible to read, substantially simultaneously to writing, with an output bus and a second address bus.

In conventional data reorganization circuits, the data is first written into the memory in a first order. The data is not read from the memory until all the data is written into the memory. After all the data is written into the memory, the data is read out of the memory in a second order. Indeed the circuit must wait until all the data is written before reading can begin, since the input and output orders of the data are generally distinct and arbitrary (i.e., it is not known when each datum of the data has been written). Thus, a drawback of such an ordering circuit is that such an ordering circuit has a response delay, or latency, that is equal to the number of write cycles needed to fill the memory with all the data.

SUMMARY OF THE INVENTION

An object of the present invention is to provide a data reorganization circuit including a dual-port memory, authorizing the circuit to read a datum from the memory at the very moment the datum to be read is present in the memory.

By achieving this object, the invention allows some data to be read from the memory before all the data is written into the memory.

To achieve this object, one illustrative embodiment of the present invention provides a data reorganization process, including the steps of writing words in a dual-port memory in a first predetermined order and reading the words from the memory in a second predetermined order. Each time a word is written, a register is incremented by an increment whose optimum value is equal to 1 plus the difference between the input rank of the word (i.e., the position of the word in the write order) and the output rank of this word (i.e., the position of the word in the read order if the difference is non-negative). The increment is zero if the difference is negative. The register is decremented at each read. The effect is that the sum of the increment and decrements that are used until the current word is written is lower than, or equal to, the sum of the optimum values of these used increments. Reading of the words is authorized only if the content of the register is non-zero.

According to an embodiment of the invention, the process includes the step of inhibiting the writing of words between the time when the writing of a packet of words is ended and the time when the reading of this packet is ended.

In another illustrative embodiment of the present invention, a data reorganization circuit is provided, including a dual-port memory coupled to a system to write words in a first predetermined order with a first bus and to read these words in a second predetermined order with a second bus. A register is connected to the reorganization circuit to authorize the reading of the memory only if the content of the register is non-zero. Circuitry is provided that decrements the content of the register each time a word is read in the memory. A decoder for decoding addresses present on the first bus provides an increment whose optimum value is equal to 1 plus the difference between the input rank of the current word provided on the first bus and the output rank of this word if the difference is non-negative, and whose value is zero if the difference is negative. The effective value of this increment is such that the sum of the increments used until the writing of the current word is lower than, or equal to, the sum of the optimal values of these used increments. An adder adds the increment to the content of the register at each write.

According to another embodiment of the invention, the circuit includes a write counter that is incremented each time a word is written, and that is reset at the end of each reading of a packet of words, and circuitry for inhibiting writing as long as the write counter is at a maximum value.

The foregoing and other objects, features, aspects and advantages of the invention will become apparent from the following detailed description of the present invention when taken in conjunction with the accompanying drawings.

BRIEF DESCRIPTION OF DRAWINGS

FIG. 5A–5D illustrate four types of reorganization carried out by a data reorganization circuit according to the present invention for processing image macroblocks compressed in accordance with an MPEG standard; and.

DETAILED DESCRIPTION

Figure 1:
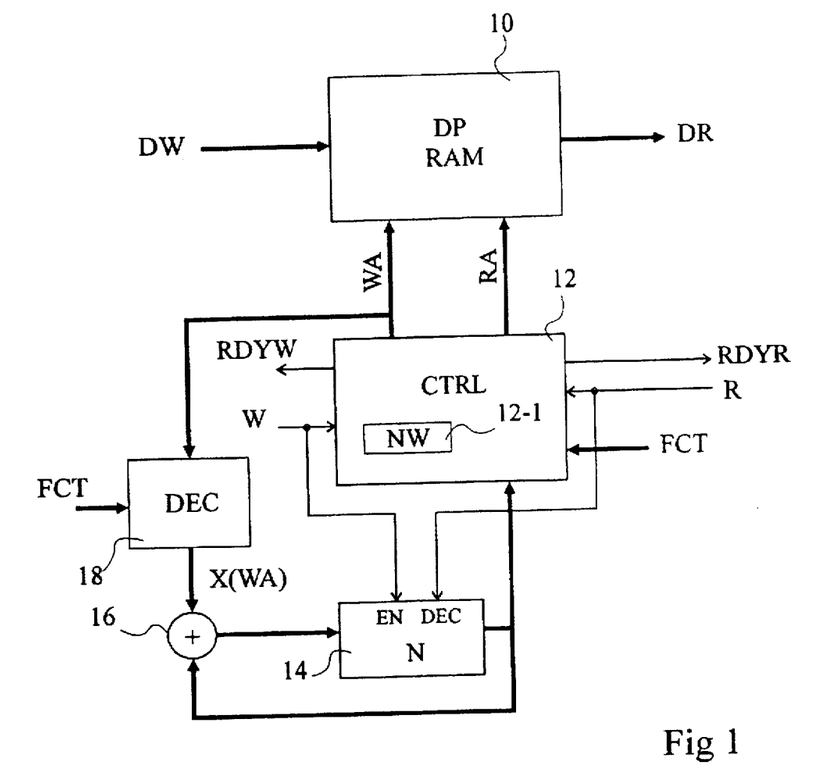
FIG. 1 represents a schematic embodiment of a data reorganization circuit according to the present invention.

In FIG. 1, data to be reorganized are written in a dual-access memory 10 through a data write bus DW. The write addresses of these data are selected by a write address bus WA. The data written in memory 10 are read-out on a data read bus DR at addresses selected by a read address bus RA. Each write operation in memory 10 is enabled by a write clock W, and each read operation is enabled by a read clock R.

In FIG. 1, the write addresses WA and the read addresses RA are provided by a control circuit 12 that determines the data reorganization. For example, the write addresses WA are incremented regularly as data are written, and the read addresses RA vary in an arbitrarily fixed way corresponding to an order of reading (or exit order) of the data that are written in memory 10.

Generally, data are arranged as a packet of a constant number of words. Memory 10 is, for example, such that it can store one packet of words and the write addresses WA and read addresses RA vary within sequences having a period equal to the number of words in a packet.

The present invention synchronizes the issuing of read addresses RA with the issuing of write addresses WA so that a particular word can be read-out as soon as it is written into the memory.

To achieve this purpose, the invention provides a register 14 that stores the number N of words that are available for reading in memory 10, i.e., the number of words that can be read-out in the right order. Number N is updated each time a word is written in memory 10 by adding an increment X to number N. To achieve this purpose, for example, register 14 is enabled by the write signal W and the input of register 14 receives, through an adder 16, the sum of the register's output and of the value X(WA) provided by a decoder 18. Decoder 18 associates a value X with each write address WA. Each increment X is equal to 1 plus the difference between the input rank of the word that is currently written and the output rank of the same word if the difference is non-negative. If the difference is negative, increment X is zero.

The values of increments X such as defined above are optimum values $X_{opt}$. For the circuit to operate, it is sufficient that the sum of the increments used until the word that is currently written be lower than, or equal to, the sum of the corresponding optimum increment. In any case, the total sum of increments X used for a packet of words is equal to the number of words in the packet.

The content of register 14 is decremented by one at each read operation in memory 10. For this purpose, the read signal R, for example, is provided to a decrementation input of register 14. Register 14 may be a downcounter receiving the read signal R at a decrementation input, signal W at a load enabling input, and the output of adder 16 at a load input.

The control circuit 12 receives the content of register 14 to determine the assertion of control signals RDYW and RDYR. Signal RDYW (Ready for Write) is used to indicate to a writing circuit (not shown) whether the reorganization circuit is ready to receive, data. If signal RDYW is asserted, the writing circuit successively asserts the write signal W as it presents words on bus DW. The write addresses WA are incremented by the control circuit 12 at the rate of the write signal W.

Signal RDYR (Ready For Read) is used to indicate to a reading circuit (not shown) whether the reorganization circuit is ready to provide data. When signal RDYR is asserted, the reading circuit successively asserts the read line R as it reads the words present on bus DR. At each assertion of the read signal R, the control circuit 12 modifies the read address RA to provide the words in the correct read order. The sequence of the read addresses RA is predefined as a function of the order in which the words in memory 10 must be read-out. These addresses are, for example, stored in a memory table addressed by a counter which is incremented by the read signal R.

Signal RDYR is asserted when the number N stored in register 14 is non-zero. Thus, signal RDYR is, for example, provided by an OR gate receiving all the bits of register 14.

Signal RDYW is asserted as soon as a packet of words has been extracted from memory 10. To generate this signal RDYW, for example, a write counter 12-1 counts the number NW of words written in the memory 10. Signal RDYW is then, for example, provided by an RS flip-flop (not shown) that is reset when the number of written words NW is equal to the number of words in a packet. Signal RDYW is set back to 1 (asserted) when the number N of words available in memory 10 is zero and if the number of written words NW is equal to the number of words in a packet. The assertion of signal RDYW cancels the number of written words NW.

Figure 2:
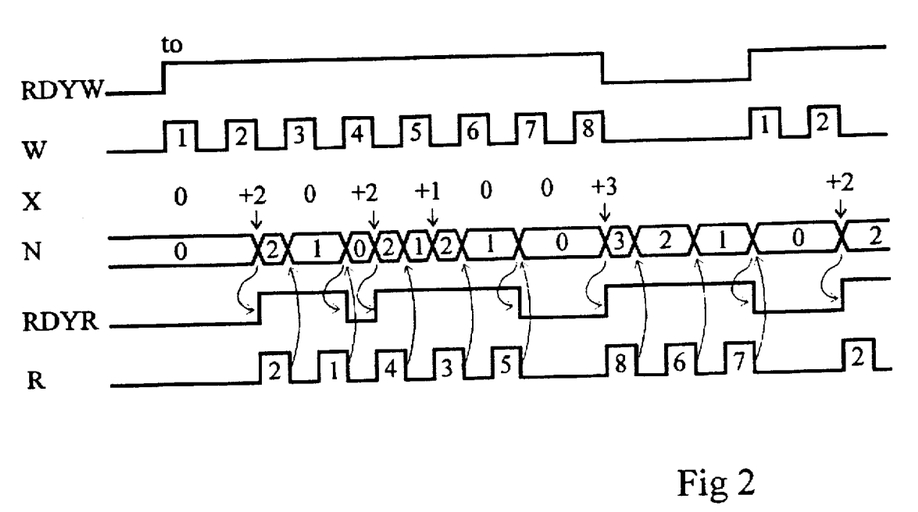
FIG. 2 is a timing diagram illustrating the operation of the circuit of FIG. 1.

FIG. 2 is a timing diagram illustrating the operation of the circuit of FIG. 1 in an example of reorganizing a packet of eight words 1–8. In this example, the words are written successively as follows:

1, 2, 3, 4, 5, 6, 7, 8, and the words have to be read-out successively as follows:

2, 1, 4, 3, 5, 8, 6, 7.

Hence, the output rank for each word is, respectively:

2, 1, 4, 3, 5, 7, 8, 6;

(i.e., the word with an input rank of 1 has an output rank of 2, . . . , the word with an input rank of 6 has an output rank of 7).

The values X associated with the written words are:

0, 2, 0, 2, 1, 0, 0, 3.

At time $t_0$, memory 10 is empty, number N is zero and signal RDYW is asserted. Then, the write signal W is successively asserted to write the eight words in memory 10.

Number N is zero until the word of input rank 2 and output rank 1 is written. Then, number N is incremented by 2 and signal RDYR is asserted, thus causing successive assertions of the read signal R to read-out the words from memory 10, for example at the same rate as the write signal. First, the word of input rank 2 and output rank 1 is read, number N is set to 1; then, the word of input rank 1 and output rank 2 is read, number N is reset thus causing the disabling of signal RDYR.

When the word of input rank 4 and output rank 3 is written in memory 10, number N is incremented by 2. This incrementation occurs in the example of FIG. 2 when number N becomes zero as the word of input rank 1 and output rank 2 is read. Signal RDYR is again asserted and the reading of words is resumed.

The word of input rank 4 and output rank 3 is read, number N becomes 1, then the word of input rank 3 and output rank 4 is read. In the meantime, the word of input rank 5 and output rank 5 has been written and the number N has been incremented by one. When reading the word of input rank 3 and output rank 4, number N becomes 1, the word of input rank 5 and output rank 5 is read, number N becomes 0 thus disabling signal RDYR.

Number N is incremented by 3 when writing the word of input rank 8 and output rank 6, which is the last word of the packet. Signal RDYW is disabled and signal RDYR is asserted. The words of input ranks 8, 6 and 7 (and output ranks 7, 8 and 6, respectively) are successively read, number N becomes 2, then 1, and at last 0.

Once the word of input rank 6 and output rank 8 is read, memory 10 is empty. Signal RDYW is again asserted, which allows a new packet of eight words to be written.

It can be observed that the latency time of the reorganization circuit according to the invention (i.e., the difference between the end of the writing of a packet and the end of the reading of the packet), is three read cycles, which corresponds to the maximum value of increment X.

Of course, a reorganization circuit according to the invention can be realized to carry out several reorganizations that are selected by a bus FCT (FIG. 1) determining the decoding function of decoder 18 and the read addresses (RA) generation function of the control circuit 12.

A reorganization circuit according to the invention is particularly useful in the filtering for encoding or decoding image blocks in accordance with standards established by the Moving Pictures Experts Group (MPEG standards). In such encoding or decoding circuits, data are arranged in the form of a macro-block (MB) corresponding to a 16×16-pixel image block.

Figure 3:
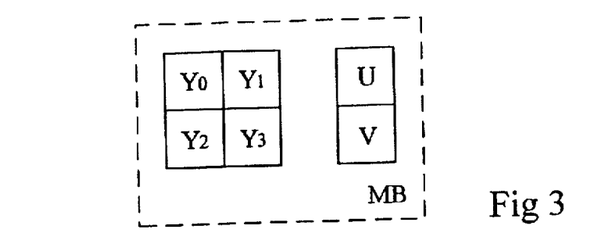
FIG. 3 represents a macro-block of a digital image constituting data that can be processed by a reorganization circuit according to the present invention.

FIG. 3 represents an example of a format, referred to as 4:2:0, of an MPEG macro-block. This MPEG macro-block includes a luminance block formed by four blocks Y0–Y3 of 8×8 pixels and a chrominance block formed by two blocks U and V of 8×8 pixels. An alternative format is referred to as 4:2:2 in which the chrominance block includes two blocks of 8×16 pixels. A macro-block of format 4:2:0 is constituted by a packet of 384 1-byte pixels.

Figure 4:
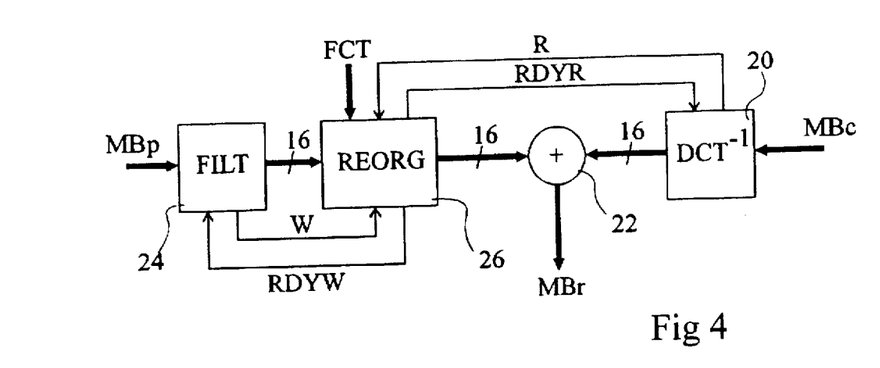
FIG. 4 represents an insertion of a data reorganization circuit according to the present invention in a processing chain of image data compressed in accordance with an MPEG standard.

FIG. 4 schematically represents a portion of an MPEG decoding circuit for filtering macro-blocks. A currently decoded macro-block MBc is provided to an inverse discrete cosine transform (DCT) circuit 20.

The output of DCT circuit 20 is summed by an adder 22 to the output of a so-called half-pixel filter 24, to provide a reconstructed macro-block MBr. Filter 24 receives so-called predictor macro-blocks MBp, found in a previously reconstructed image. The order of arrival of the pixels into filter 24 differs from the exit order of the corresponding pixels from the DCT circuit. Accordingly, a reorganization circuit 26, which is advantageously a reorganization circuit according to the invention, must be provided at the output of filter 24. The write signal W and signal RDYW are exchanged between circuit 26 and filter 24. The read signal R and signal RDYR are exchanged between circuit 26 and, the DCT circuit 20.

The data provided by filter 16 and by the DCT circuit are 16-bit words, each corresponding to a pair of pixels.

Moreover, the DCT circuit provides either interlaced or progressive macro-blocks regardless of the fact that the predictor blocks provided to filter 24 can also be interlaced or progressive. Thus, there are four reorganization possibilities which are selected by the bus FCT.

FIGS. 5A–5D illustrate examples of each of these four reorganizations. These figures represent tables of increments X associated with the pairs of pixels of a macro-block written in memory 10 of the reorganization circuit.

Figure 5A:
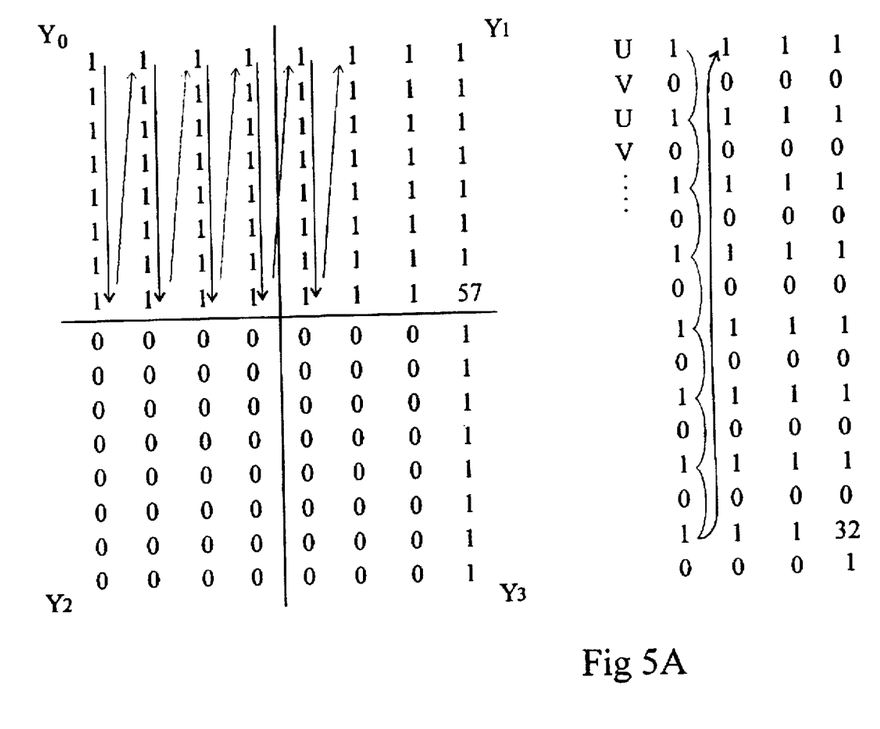

FIG. 5A illustrates a macro-block reorganization in the case where the macro-blocks are provided by filter 24 in progressive form and also provided to adder 22 in progressive form.

The pairs of pixels provided by filter 24 arrive, for example, in columns of 16 pairs of pixels by scanning from top to bottom and from left to right, first the luminance blocks Y, then the chrominance blocks U and V. More precisely, the luminance blocks Y arrive by alternating one column of block Y0 and one column of block Y2; then, once blocks Y0 and Y2 have arrived, by alternating one column of block Y1 and one column of block Y3. The chrominance blocks U and V arrive by alternating one pair of U pixels and one pair of V pixels. The pixel pairs are written in the reorganization circuit in their order of arrival.

The pixel pairs are read-out, for example, by columns of 8 pairs of pixels, from top to bottom and from left to right, to successively completely provide each block Y0, Y1, Y2, Y3, U and V, as partially illustrated by arrows.

Note in the table of FIG. 5A that the highest value of X is 57, which means that the latency time of the reorganization circuit is, in this case, 57 read cycles for 192 written pairs of pixels.

Figure 5B:
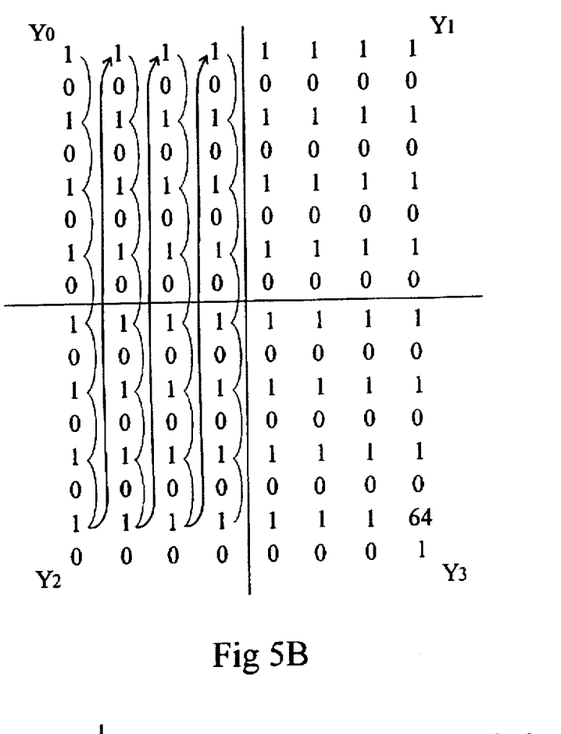

FIG. 5B represents a macro-block reorganization in the case where the macro-blocks are provided in progressive form by filter 24 whereas adder 22 receives macro-blocks in interlaced form. The pairs of pixels are written in the reorganization circuit 26 in the same way as above.

The pairs of pixels are read-out by columns to provide the pairs of pixels of odd lines of the successive blocks Y0, Y2, Y1, Y3; then, the pairs of pixels of even lines of the successive blocks Y0, Y2, Y1, Y3. The chrominance blocks are read-out in the same way as in the case of FIG. 5A.

The latency time in this case is 64 read cycles.

Figure 5C:
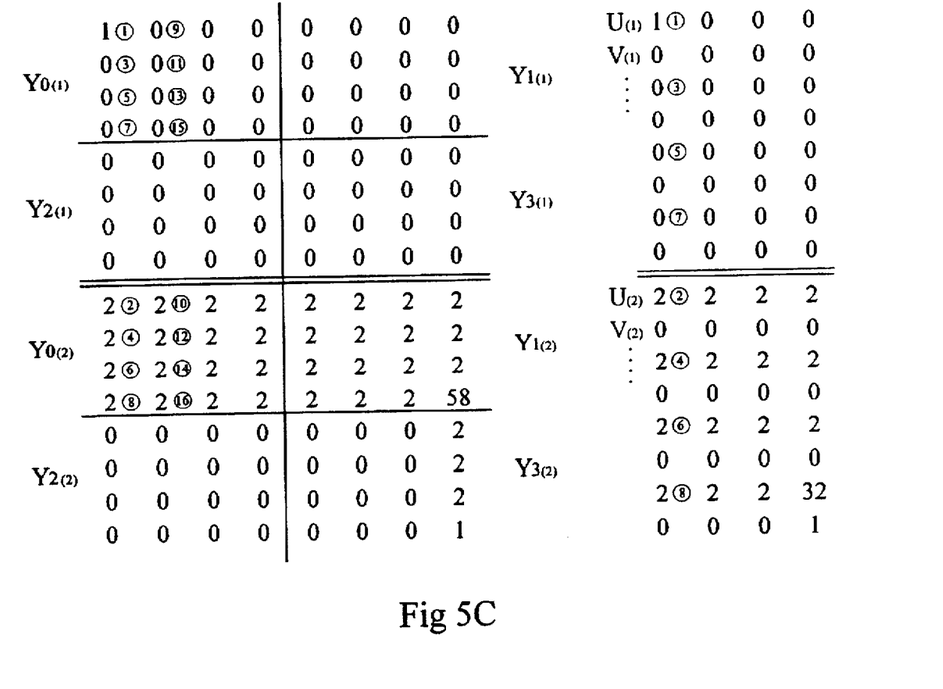

FIG. 5C illustrates a reorganization in the case where filter 24 provides interlaced macro-blocks and where macro-blocks are provided to adder 22 in progressive form.

The pairs of pixels provided by filter 24 arrive by columns of 8 pairs of pixels by scanning, from top to bottom and from left to right, the odd luminance blocks (Y0(1) to Y3(1)), the even luminance blocks (Y0(2) to Y3(2)), the odd chrominance blocks (U(1) and V(1)), and last, the even chrominance blocks U(2) and V(2)o An odd block, assigned (1), contains only the pairs of pixels of odd lines of the corresponding complete block. An even block, assigned (2), contains only the pairs of pixels of even lines of the corresponding complete block. Each of the even and odd blocks (luminance and chrominance) arrives in the same way as the corresponding complete block of FIG. 5A, except that each odd or even block contains only 4 pairs of pixels in it columns.

The pairs of pixels are read-out to provide successively each block Y0, Y1, Y2, Y3, U and V by columns of 8 pairs of pixels. In FIG. 5B, the read order is represented by circled numbers. For example, to reconstitute the first column of block Y0, the first through fourth pairs of pixels are alternatively read in blocks Y0(1) and Y0(2). Blocks U and V are reconstituted in the same way.

In this case, the latency time of the reorganization circuit is 58 read cycles.

Figure 5D:
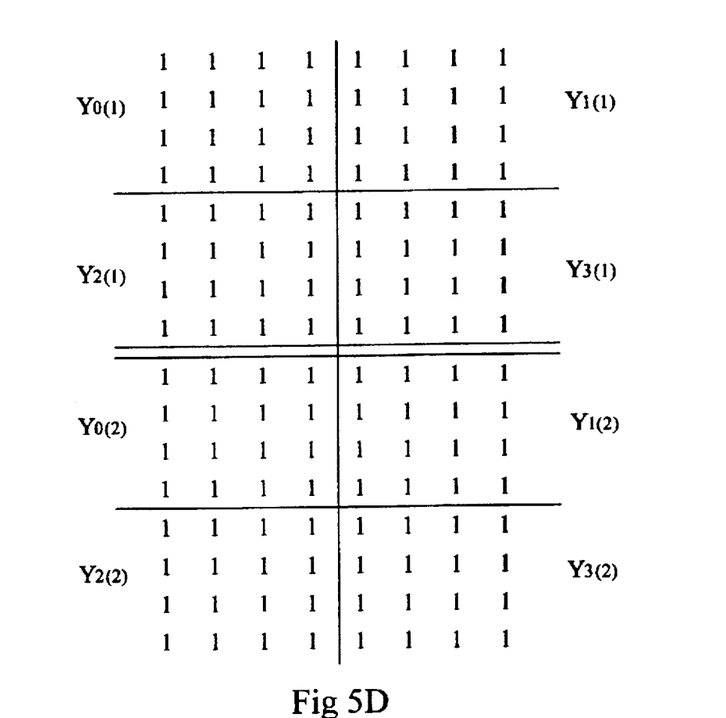

FIG. 5D illustrates a reorganization in the case where filter 24 provides interlaced macro-blocks which have to be provided to adder 22 in interlaced form.

The blocks are written in the reorganization circuit as described with relation to FIG. 5C and are read-out in the same order. In fact, the reorganization circuit is useless in this case. All increments X are at 1 and the latency time is 1 read cycle.

In this implementation of an MPEG processing circuit, as in the general case, the reorganization circuit prevents a new packet of data (i.e., a new macroblock) from being written as long as the preceding packet has not been read-out. Thus, data cannot be provided in continuous flow to the reorganization circuit.

A conventional method to avoid this drawback is to use a buffer preceding the reorganization circuit, whose capacity corresponds to the number of words written during the latency time of the reorganization circuit.

Figure 6:
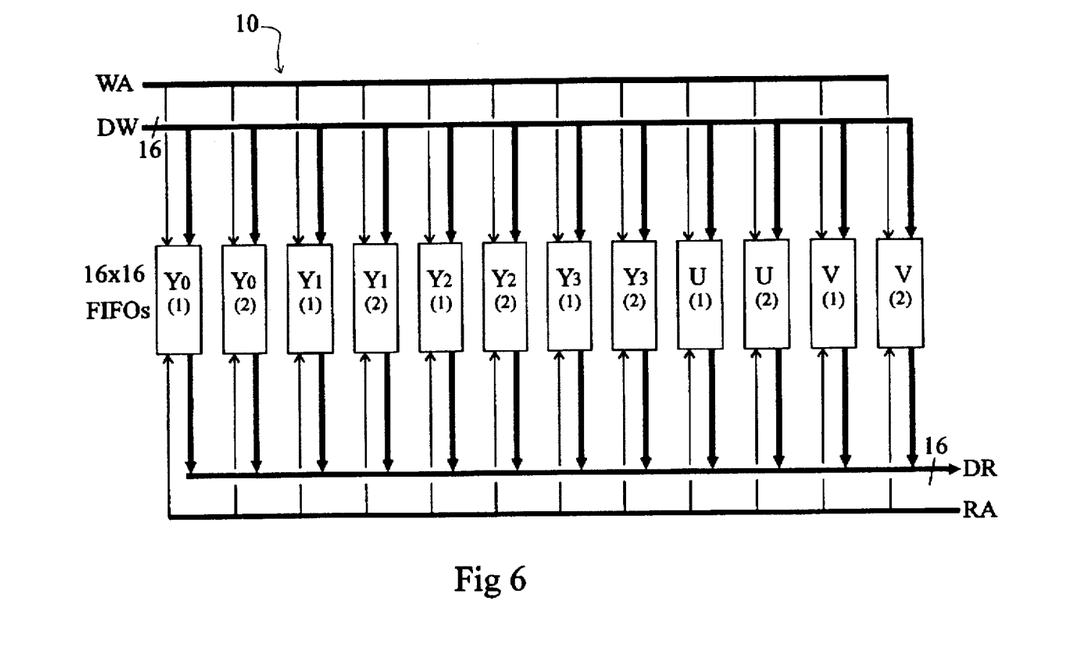
FIG. 6 represents an embodiment of a dual-access memory which is particularly advantageous in the field of MPEG decoding.

The MPEG processing is particularly well adapted to the use of two reorganization circuits according to the invention that are connected in parallel to process pixels written in continuous flow. For example, he first circuit reorganizes the luminance blocks Y0–Y3, and the second the chrominance blocks U and V, which is easy to realize since the luminance blocks and the chrominance blocks correspond to well differentiated packets (i.e., the chrominance pixels are not mixed with the luminance pixels, neither at the input nor at the output). Then, the memory that is used corresponds to a macro-block, so it is unnecessary to increase this memory by adding a buffer memory FIG. 6 represents a very advantageous embodiment of a dual-port memory to be used in a reorganization circuit according to the invention adapted to MPEG image processing. This memory includes 12 buffer memories, of first-in/first-out (FIFO) type, of 16 words of 16 bits each. The write bus DW is connected to all the inputs of the FIFO memories, and the read bus DR is connected to all the outputs of the FIFO memories. The write address bus WA includes, for example, 12 lines each selecting one FIFO in write mode, and the read address bus RA includes, for example, 12 lines each selecting one FIFO in read mode.

Each FIFO is intended to store the odd pairs of pixels or the even pairs of pixels of each 8×8-pixel block of a macro-block. In this way, the pairs of pixels can be provided in the correct read order in each of the above described four cases by using a particularly simple addressing mode, and an inexpensive dual-port memory structure.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A method for reorganizing a plurality of words of data from a first order to a second order, each word having an input rank corresponding to its position in the first order and an output rank corresponding to its position in the second order, the method comprising the steps of:

writing the plurality of words in a dual-port memory according to the first order;

incrementing a content of a register by an increment when one of the plurality of words is written into the memory, the increment being equal to one plus a difference between the input and output ranks of the one of the plurality of words written into the memory when the difference is non-negative, the increment being equal to zero when the difference is negative;

reading the plurality of words from the memory according to the second order, each of the plurality of words being read only when the content of the register is non-zero and decrementing by one the content of the register when one of the plurality of words is read.

2. The method of claim 1, wherein the plurality of words includes a plurality of packets of words, each packet containing a predetermined number of words, and further including the step of:

inhibiting writing of the plurality of words of a second packet until each of the plurality of words of a first packet has been written in and read from the memory.

3. A data reorganization circuit for reorganizing a plurality of words of data from a first order to a second order, each word having an input rank Corresponding to its position in the first order and an output rank corresponding to its position in the second order, the data reorganization circuit comprising:

a dual-port memory having;

an input that receives the plurality of words in the first order, an output that provides the plurality of words in the second order, a write circuit that writes the plurality of words into the memory, and a read circuit that reads one of the plurality of words from the memory when enabled;

a register, coupled to the read circuit, that enables the read circuit to read one of the plurality of words from the memory only when a content of the register is non-zero;

decrementing circuitry, coupled to the register, that decrements the content of the register when one of the plurality of words is read from the memory;

incrementing circuitry, coupled to the write circuitry, that generates an increment associated with each of the plurality of words written into the memory, each increment being equal to one plus a difference between the input and output ranks of its associated one of The plurality of words when the difference is non-negative, and being zero when the difference is negative; and an adder, coupled between the incrementing circuitry and the register, that adds the associated increment to the content of the register when each of the plurality of words is written into the memory.

4. The data reorganization circuit of claim 3, wherein the plurality of words includes a plurality of packets of words, each packet containing a predetermined number of words, wherein the write circuit writes the plurality of words only when enabled, and wherein the system further includes:

a counter, coupled to the memory, that stores a content that is incremented when one of the plurality of words is written into the memory, and is reset when all of the words of a packet have been read from the memory, the counter having an output, coupled to the write circuit of the memory, that provides a write enable signal to the write circuit when the content of the counter is below the predetermined number of words in a packet.

5. A method of reorganizing a plurality of words of data from a first order to a second order, each word having an input rank corresponding to its position in the first order and an output rank corresponding to its position in the second order, the method comprising the steps of:

A. writing the plurality of words into a memory according to the first order; and B. while writing the plurality of words into the memory, determining when a first word of the second order has been written into the memory based on a calculation of the input and output ranks of words written into the memory, and when it has been determined that the first word of the second order has been written into the memory, reading the first word of the second order from the memory.

6. The method of claim 5, further including the step of:

C. determining when a next word of the second order has been written into the memory, and when it has, reading the next word of the second order from the memory.

7. The method of claim 6, further including the step of:

determining when each of the plurality of words has been read from the memory, and when each has not been read, repeating step C.

8. The method of claim 6, wherein steps B and C include the steps of:

when a word is written into the memory, updating a content of a register according to a difference between the input and output ranks of that word;

decrementing the content of the register by one when one of the plurality of words is read from the memory; and reading one of the plurality of words from the memory only when the content of the register is non-zero.

9. The method of claim 8, wherein the step of updating the content of the register includes the step of:

incrementing the content of the register by one plus the difference when the difference is non-negative.

10. The method of claim 9, wherein the plurality of words includes a plurality of packets of words, each packet containing a predetermined number of words, and wherein step A includes the steps of:

writing a first packet to the memory;

updating a content of a word counter to indicate a number of words in the first packet that have been written into the memory; and writing a second packet of words into the memory when the content of the counter is zero, indicating that all of the words of the first packet have been read from the memory.

11. The method of claim 5, wherein the plurality of words includes a plurality of packets of words, each packet containing a predetermined number of words, and wherein step A includes the steps of:

writing a first packet of words into the memory; and writing a second packet of words into the memory only after the first packet of words has been read from the memory.

12. The method of claim 5, wherein the plurality of words includes a plurality of packets of words, each packet containing a predetermined number of words, and wherein step A includes the steps of:

writing a first packet to the memory;

updating a content of a word counter to indicate a number of words in the first packet that have been written into the memory; and writing a second packet of words into the memory when the content of the counter is zero, indicating that all of the words of the first packet have been read from the memory.

13. The method of claim 5, wherein step B includes a step of:

reading the first word of the second order from the memory before at least one other word of the second order has been written into the memory.

14. The method of claim 5, wherein step B includes a step of:

incrementing, when the first word of the second order is written into the memory, a content of a register with an increment based on a difference between the input rank and the output rank of the first word of the second order; and reading the first word of the second order from the memory when the content of the register exceeds a predetermined value.

15. The method of claim 5, wherein step B includes a step of reading the first word of the second order from the memory before every word of the first order has been written into the memory.

16. The method of claim 15, wherein the method further comprises a step of:

reading other words of the second order from the memory until all of the words of the first order have been read from the memory in the second order.

17. A reorganization circuit for reorganizing a plurality of words of data from a first order to a second order, each word having an input rank corresponding to its position in the first order and an output rank corresponding to its position in the second order the circuit comprising:

a memory having an input that receives the plurality of words in the first order, and an output that provides the plurality of words in the second order;

a write circuit that writes the plurality of words into the memory;

a read circuit that reads one of the plurality of words from the memory when enabled; and control means for determining when a first word of the second order has been written into the memory based on a calculation of the input and output ranks of words written into the memory, and for enabling the read circuit to read the first word from the memory, when it is determined that the first word has been written into the memory.

18. The reorganization circuit of claim 17, further including:

means for determining when a next word of the second order has been written into the memory, and for enabling the read circuit to read the next word of the second order from the memory when it is determined that the next word has been written into the memory.

19. The reorganization circuit of claim 18, plurality of words has an input rank corresponding to its position in the first order and an output wherein the control means includes:

a register having a content;

means for updating the content of the register according to a difference between the input and output ranks of a word when that word is written into the memory;

means for decrementing the content of the register by one when a word is read from the memory; and means for enabling the read circuit to read the next word of the second order from the memory when the content of the register is non-zero.

20. The reorganization circuit of claim 19, wherein the means for updating the content of the register includes:

means for incrementing the content of the register by one plus the difference when the difference is non-negative.

21. The reorganization circuit of claim 20, wherein the plurality of words includes a plurality of packets of words, each packet containing a predetermined number of words, and wherein the reorganization circuit further includes:

a word counter having a content indicating a number of words of a packet that have been written to the memory;

means for incrementing the content when a word is written into the memory;

means for resetting the content to zero when the content equals the predetermined number of words in a packet and all of the words in the memory have been read; and means for enabling the write circuit to write the packet of words into the memory when the content of the counter is zero.

22. The reorganization circuit of claim 17, wherein the plurality of words includes a plurality of packets of words, each packet containing a predetermined number of words, and wherein the reorganization circuit further includes:

a word counter having a content indicating a number of words of a packet that have been written to the memory;

means for incrementing the content when a word is written into the memory;

means for resetting the content to zero when the content equals the predetermined number of words in a packet and all of the words in the memory have been read; and means for enabling the write circuit to write the packet of words into the memory when the content of the counter is zero.

23. The reorganization circuit of claim 17, wherein the control means includes:

means for enabling the read circuit to read the first word of the second order from the memory before at least one other word of the second order has been written into the memory.

24. The reorganization circuit of claim 17, wherein the control means includes:
a register having a content;
means for incrementing the content of the register with an increment based on a difference between the input rank and the output rank of the first word of the second order; and
means for enabling the read circuit to read the first word of the second order from the memory when the content of the register exceeds a predetermined value.

25. The reorganization circuit of claim 17, wherein the control means includes:
means for enabling the read circuit to read the first word of the second order from the memory before every word of the first order has been written into the memory.

26. The reorganization circuit of claim 25, wherein the control means further includes:
means for enabling the read circuit to read other words of the second order from the memory until all of the words of the first order have been read from the memory in the second order.

27. A reorganization circuit for reorganizing a plurality of words of data from a first order to a second order, each word having an input rank corresponding to its position in the first order and an output rank corresponding to its position in the second order, the circuit comprising:
a memory having an input that receives the plurality of words in the first order, and an output that provides the plurality of words in the second order;
a write circuit that writes the plurality of words into the memory when enabled;
a read circuit that reads the plurality of words from the memory when enabled; and
control circuitry, coupled to the memory, that enables the write circuit to write the plurality of words into the memory in the first order, and simultaneously determines when a first word of the second order has been written into the memory based on a calculation of the input and output ranks of word written into the memory, and enables the read circuit to read the first word of the second order from the memory when it determines that the first word has been written into the memory.

28. The reorganization circuit of claim 27, wherein the control circuitry further determines when a next word of the second order has been written into the memory, and when it has, enables the read circuit to read the next word of the second order from the memory.

29. The reorganization circuit of claim 28, wherein the control circuitry includes:
a register having an input and an output and storing a content;
register updating circuitry, having a first input coupled to the write circuit, a second input coupled to the output of the register, and an output coupled to the input of the register, the register updating circuitry updating the content of the register when a word is written to the memory, the register being updated according to a difference between the input and output ranks of that word;
register decrementing circuitry, having an input coupled to the read circuit and an output coupled to the input of the register, that decrements the content of the register by one when one of the plurality of words is read from the memory; and
read enable circuitry, having an input coupled to the output of the register and an output coupled to the read circuit, that sends an enable signal to the read circuit to enable reading of one of the plurality of words from the memory when the content of the register is non-zero.

30. The circuit of claim 29, wherein the register updating circuitry further includes:
arithmetic circuitry having a first input coupled to the write circuit, a second input coupled to the output of the register, and an output coupled to the input of the register, the arithmetic circuitry calculating the difference and incrementing the content of the register by one plus the difference when the difference is non-negative.

31. The circuit of claim 30, wherein the plurality of words includes a plurality of packets of words, each packet containing a predetermined number of words, and wherein the control circuitry further includes:
a word counter having an input, an output and a content indicating a number of words of a packet that have been written into the memory;
counter updating circuitry having an input coupled to the write circuit and an output coupled to the input of the word counter, the counter the content of the word counter according to the number of words written into the memory; and
write enable circuitry having an input coupled to the output of the word counter and an output coupled to the write circuit, the write enable circuitry sending a write enable signal to the write circuit to enable the writing of the packet of words into the memory when the content of the counter is zero.

32. The circuit of claim 31, wherein the counter updating circuitry includes:
incrementing circuitry having an input coupled to the write circuit and an output coupled to the input of the word counter, the incrementing circuitry incrementing the content of the word counter when one of the plurality of words is written into the memory; and
resetting circuitry having an input coupled to the read circuit and an output coupled to the input of the word counter, the resetting circuitry resetting the content to zero when the content equals the predetermined number and all of the words in the memory have been read.

33. The circuit of claim 27, wherein the plurality of words includes a plurality of packets of words, each packet containing a predetermined number of words, and wherein the control circuitry includes:
a word counter having an input, an output and a content indicating a number of words of a packet that have been written into the memory;
counter updating circuitry having an input coupled to the write circuit and having an output coupled to the input of the word counter, the counter updating circuitry updating the content of the word counter according to the number of words written into the memory; and
write enable circuitry having an input coupled to the output of the word counter and an input coupled to the write circuit, the write enable circuitry sending a write enable signal to the write circuit to enable the writing of the packet of words into the memory when the content of the counter is zero.

34. The reorganization circuit of claim 27, wherein the control circuitry includes an output that provides a signal to the read circuit enabling the read circuit to read the first word of the second order from the memory before at least one other word of the second order has been written into the memory.

35. The reorganization circuit of claim 27, wherein the control means includes:
   incrementing circuitry;
   a register, coupled to the memory and the incrementing circuitry, wherein the register stores a content that is incremented by the incrementing circuitry based on a difference between the input rank and the output rank of the first word of the second order; and
   a signaling circuit, coupled to the register and the read circuit, wherein the signaling circuit provides an enabling signal to the read circuit to read the first word of the second order from the memory when the content of the register exceeds a predetermined value.

36. The reorganization circuit of claim 27, wherein the control circuitry includes:
   an output that provides a signal to the read circuit enabling the read circuit to read the first word of the second order from the memory before every word of the first order has been written into the memory.

37. The reorganization circuit of claim 36, wherein the control circuitry is constructed and arranged so that the output provides the signal to the read circuit enabling the read circuit to read other words of the second order from the memory until all of the words of the first order have been read from the memory in the second order.

38. An apparatus for receiving first and second macro-blocks and providing a reconstructed macro-block, each macro-block having a plurality of words, the apparatus comprising:
   a first device having an output that provides the plurality of words of the first macro-block in a first order;
   a reorganization device having:
      an output bus:
      an input bus coupled to the output of the first device,
      a memory having an input, coupled to the input bus, that receives the plurality of words in the first order, and an output, coupled to the output bus, that provides the plurality of words in a second order,
      a write circuit that writes the plurality of words into the memory when enabled,
      a read circuit that reads the plurality of words from the memory when enabled, and
      control circuitry, coupled to the memory, that enables the write circuit to write the plurality of words into the memory in the first order, and simultaneously determines when a first word of the second order has been written into the memory and enables the read circuit to read the first word of the second order from the memory when it determines that the first word has been written into the memory;
   an adder having a first input coupled to the output bus of the reorganization device, a second input and an output; and
   a second device having an output, coupled to the second input of the adder, that provides the plurality of words of the second macro-block in the second order to the adder, the output of the adder providing the reconstructed macro-block according to the first and second macro-blocks.

39. The apparatus of claim 38, wherein the control circuitry of the reorganization device determines when a next word of the second order has been written into the memory, and when it has, that enables the read circuit to read the next word of the second order from the memory.

40. A method for reorganizing a plurality of words of data from a first order to a second order, each word having an input rank corresponding to its position in the first order and an output rank corresponding to its position in the second order, the method comprising the steps of:
   writing the plurality of words in a dual-port memory according to the first order;
   incrementing, when one of the plurality of words is written into the memory, a content of a register by an effective increment value corresponding to the input rank of the one of the plurality of words; wherein each word has an optimum increment value equal to one plus a difference between its input and output ranks when the difference is non-negative, and equal to zero when the difference is negative; and wherein the effective increment value is such that a sum of effective increment values corresponding to the one of the plurality of words and those that precede it in the first order is less than, or equal to, a sum of the optimum increment values of the one of the plurality of words and those that precede it in the first order;
   reading the plurality of words from the memory according to the second order, each of the plurality of words being read only when the content of the register is non-zero; and
   decrementing by a decrement the content of the register when one of the plurality of words is read.

41. The method of claim 40, wherein the plurality of words includes a plurality of packets of words, each packet containing a predetermined number of words, and further including a step of:
   inhibiting writing of the plurality of words of a second packet until each of the plurality of words of a first packet has been written in and read from the memory.

42. A data reorganization circuit for reorganizing a plurality of words of data from a first order to a second order, each word having an input rank corresponding to its position in the first order and an output rank corresponding to its position in the second order, the data reorganization circuit comprising:
   a dual-port memory having an input that receives the plurality of words in the first order, and an output that provides the plurality of words in the second order;
   a write circuit that writes the plurality of words into the memory;
   a read circuit that reads one of the plurality of words from the memory when enabled;
   a register, coupled to the read circuit, that enables the read circuit to read one of the plurality of words from the memory only when a content of the register is non-zero;
   decrementing circuitry, coupled to the register, that decrements the content of the register when one of the plurality of words is read from the memory;
   incrementing circuitry, coupled to the write circuit, that generates an effective increment value corresponding to the input rank of one of the plurality of words; wherein each word has an optimum increment value equal to one plus a difference between its input and output ranks when the difference is non-negative, and equal to zero when the difference is negative; and wherein the effective increment value is such that a sum of effective increment values corresponding to the one of the plurality of words and those that precede it in the first order is less than, or equal to, a sum of the optimum increment values of the one of the plurality of words and those that precede it in the first order; and an adder, coupled between the incrementing circuitry and the register, that adds the effective increment value of the increment to the content of the register when one of the plurality of words is written into the memory.

43. The data reorganizing circuit of claim 42, wherein the plurality of words includes a plurality of packets of words, each packet containing a predetermined number of words, wherein the write circuit writes the plurality of words only when enabled, and wherein the system further includes:

a counter, coupled to the memory, that stores a content that is incremented when one of the plurality of words is written into the memory, and is reset when all of the words of a packet have been read from the memory, the counter having an output, coupled to the write circuit, that provides a write enable signal to the write circuit when the content of the counter is below the predetermined number of words in a packet.

* * * * *